July 28, 1936. G. W. HOPKINS, JR 2,048,697
TRACTOR
Filed May 6, 1933 6 Sheets-Sheet 1

INVENTOR.
George W. Hopkins, Jr.

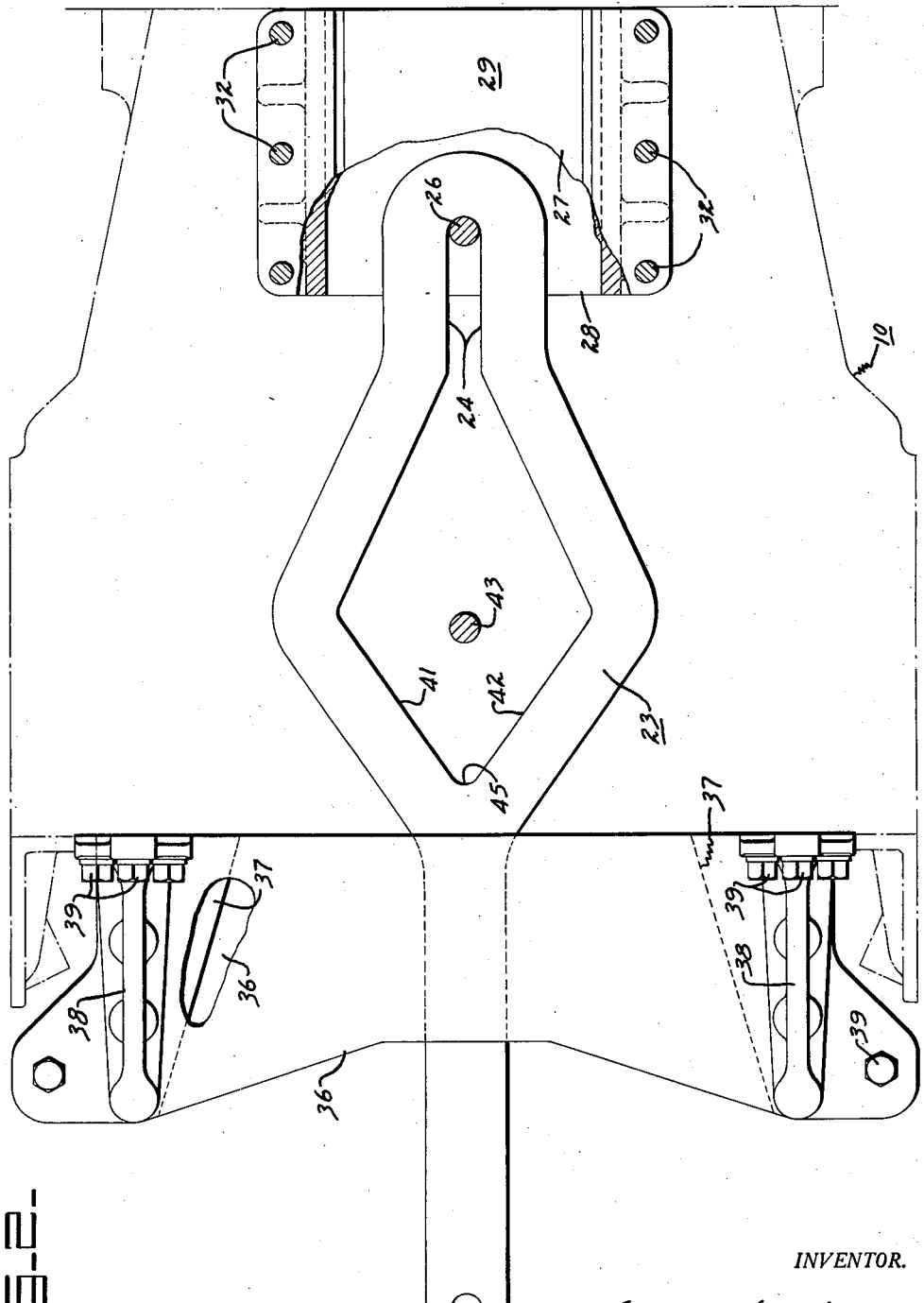

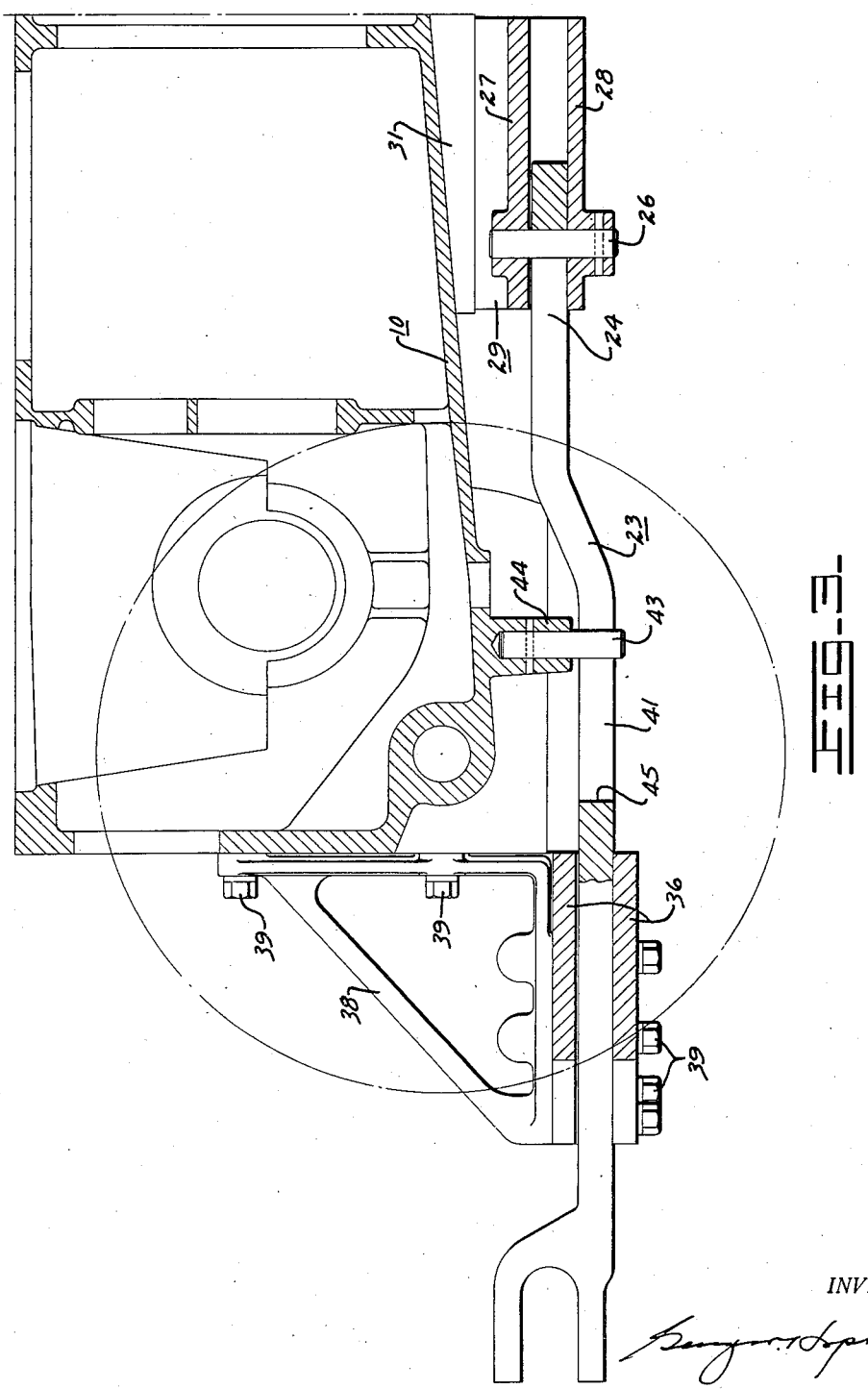

July 28, 1936.  G. W. HOPKINS, JR  2,048,697
TRACTOR
Filed May 6, 1933   6 Sheets—Sheet 4

INVENTOR.
George W. Hopkins Jr.

July 28, 1936.   G. W. HOPKINS, JR   2,048,697
TRACTOR
Filed May 6, 1933   6 Sheets—Sheet 5
Fig-6-
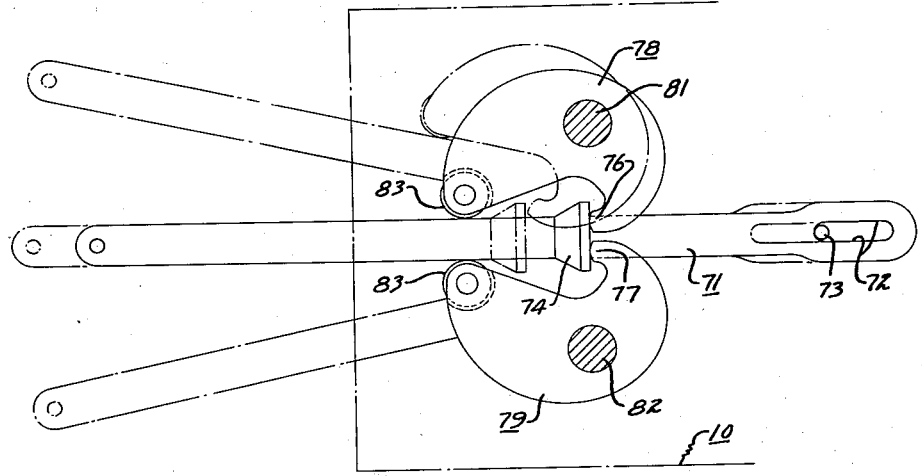
Fig-7-
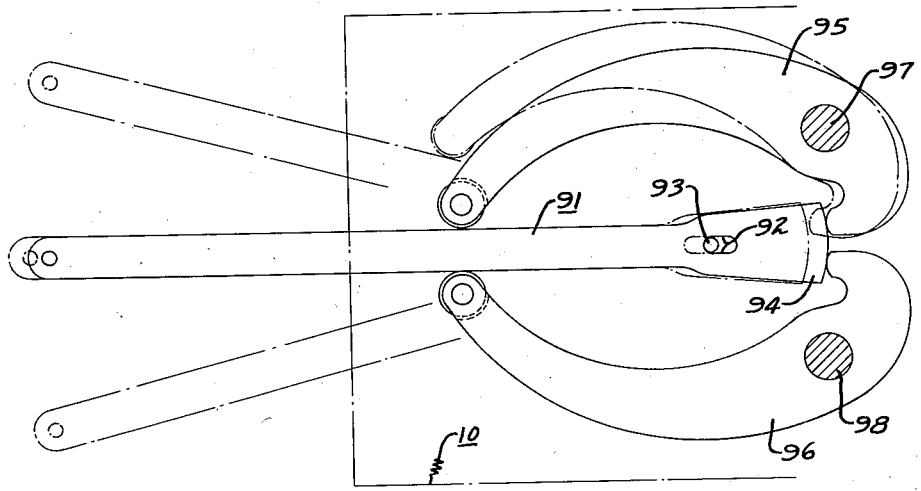
INVENTOR.

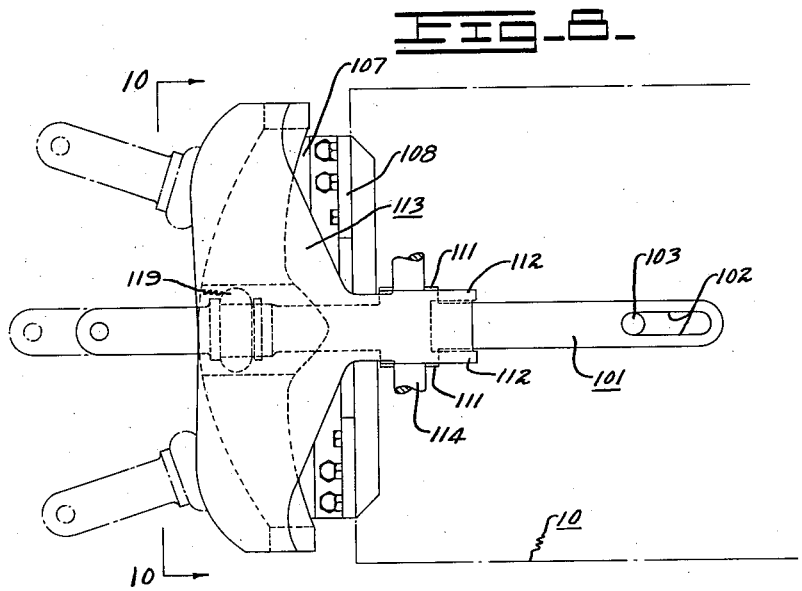
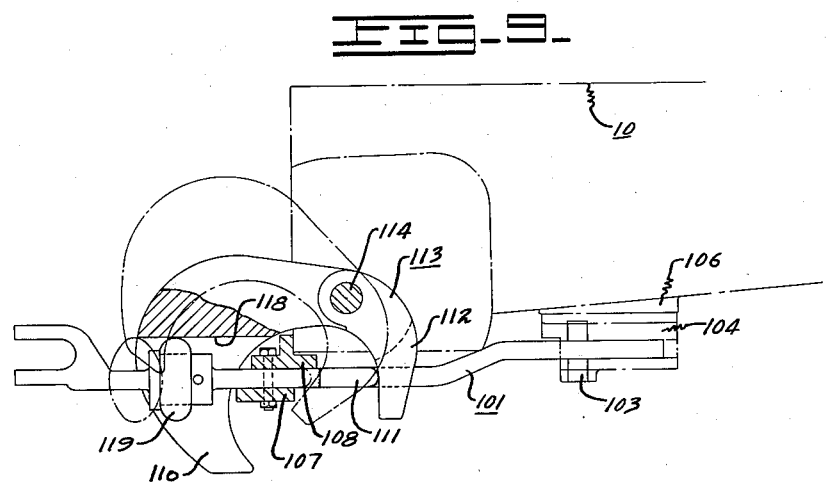
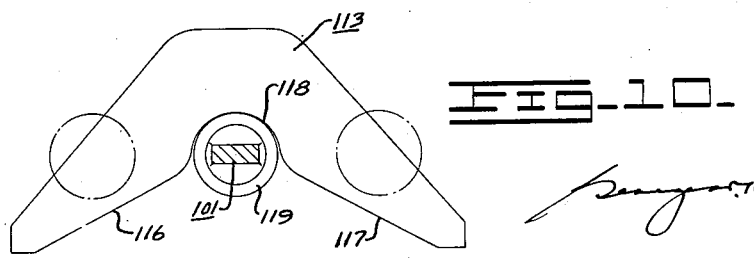

Patented July 28, 1936

2,048,697

UNITED STATES PATENT OFFICE 2,048,697

TRACTOR

George W. Hopkins, Jr., San Leandro, Calif., assignor to Caterpillar Tractor Co., San Leandro, Calif., a corporation of California Application May 6, 1933, Serial No. 669,745

12 Claims. (Cl. 280—33.12)

The present invention relates to draft vehicles, such as tractors, and more particularly to the provision of drawbar means therefor. In operation, when a tractor is pulling a drawn vehicle, the draft connection is under tension and hence tends to maintain itself in a straight line, whereby the greatest advantage can be obtained from a free lateral swinging drawbar. However, in backing the draft vehicle, or when the drawn load or vehicle tends to push the draft vehicle in going down-hill, the draft connection is under compression, and if a free lateral swinging drawbar is used, tends to buckle. When this condition obtains, the draft force cannot be applied at the most advantageous angle and the drawn vehicle sometimes causes the tractor to turn, rather than the tractor controlling movement of the drawn vehicle. If a fixed drawbar is used, certain advantages are obtained when the drawbar is under compression, but the advantages of a free lateral swinging drawbar during pulling of the drawn vehicle are lost. The present invention provides a drawbar which has a free lateral swinging movement when under tension forces, and is fixed in position when under compression forces.

It is an object of the invention to provide a self-centering drawbar for a draft vehicle.

Another object of the invention is to provide a drawbar for a tractor having a flat planar portion with an opening therethrough adapted to receive a member on the tractor of less cross sectional size than the opening.

Another object of the invention is to provide a drawbar for a tractor having integral cam means for determining free lateral swinging movement of the drawbar during one type of operation of the tractor, and preventing lateral swinging movement of the drawbar during another type of operation.

Another object of the invention is to provide a drawbar for a tractor having a fixed position and a free lateral swinging position relative to the tractor, and means engaging an end of the drawbar for controlling movement thereof from one of said positions to the other.

Another object of the invention is to provide a simple and economical drawbar construction for a tractor whereby the drawbar is capable of free lateral swinging movement under loads placing tension thereon, and is held against lateral swinging movement under loads placing compression thereon.

Another object of the invention is to provide a drawbar construction for tractors providing a fixed position of the drawbar during one type of operation and a free lateral swinging position thereof during another type of operation, said construction including means engaging said drawbar for effecting movement thereof and positioned entirely beneath the frame of the tractor.

Another object of the invention is to provide a drawbar construction for tractors providing a fixed position of the drawbar during one type of operation and a free lateral swinging position thereof during another type of operation, said construction including cam surfaces and a member adapted for engagement with said surfaces, said surfaces and the engaging portion of said member lying substantially in the horizontal plane of the drawbar.

Another object of the invention is to provide a drawbar construction for tractors providing a fixed position of the drawbar during one type of operation and a free lateral swinging position thereof during another type of operation, said construction including cam means consisting of cam surfaces converging to an apex forming a socket and a single member adapted for engagement with said surfaces.

Another object of the invention is to provide a drawbar construction for tractors providing a fixed position of the drawbar during one type of operation and a free lateral swinging position thereof during another type of operation, said construction including means pivotally mounted on the tractor and in response to movement of said drawbar to prevent lateral swinging movement thereof.

Other objects will appear as the description progresses.

Description of figures

Figs. 1-4 illustrate one form of the invention.

Fig. 1 is a side elevation of the vehicle frame, including a tractor and road machine, embodying the instant invention.

Fig. 2 is a plan view of a drawbar constructed according to the instant invention with the transmission case shown in phantom lines.

Fig. 3 is a vertical longitudinal section taken on the longitudinal center line of the tractor.

Fig. 4 is a diagrammatic plan view illustrating the various positions of the drawbar.

Fig. 6 is a diagrammatic plan view of the third form of the invention.

Fig. 7 is a diagrammatic plan view of the fourth form of the invention.

Figs. 8, 9, and 10 illustrate the fifth form of the invention.

Fig. 8 is a plan view.

Fig. 9 is a side elevation.

Fig. 10 is a detailed view taken on the line 10—10 in Fig. 8.

Description of mechanism

Figure 1:
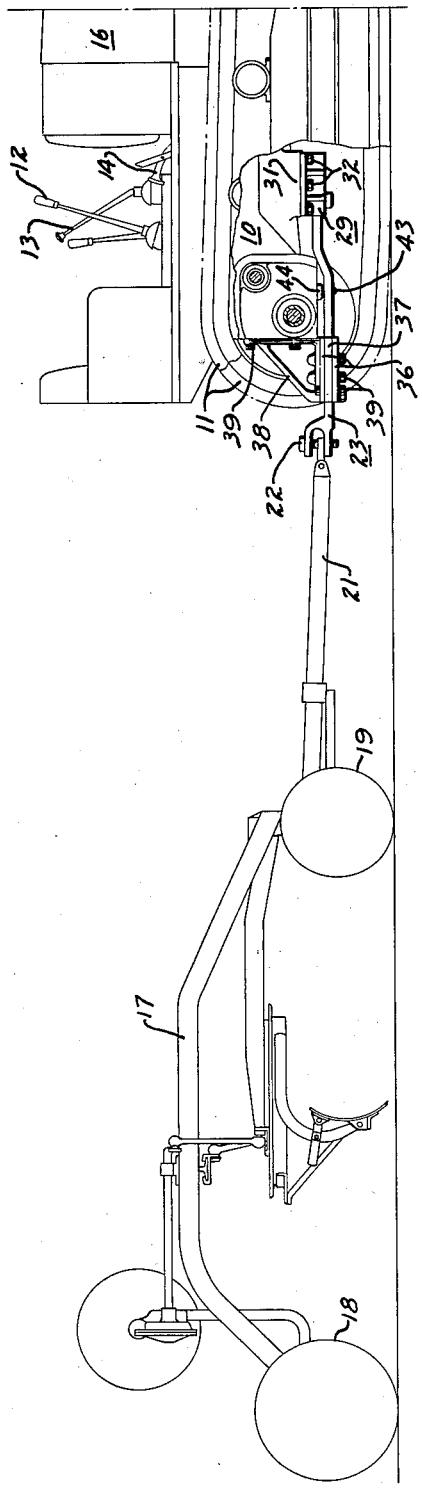

The first form of the invention, illustrated in Figs. 1-4, is disclosed as embodied in a tractor of the track-type, including main frame or body portion 10 (Fig. 1), comprising the transmission case, supported upon a pair of endless track mechanisms 11. Operation of the tractor is controlled through steering clutch control levers 12, gear shift lever 13 and brake pedals 14 at the operator's station, rearwardly of power plant 16. The drawn vehicle may be of any suitable type, and is shown as a road grader, which includes frame 17 having rear supports 18 and front supports 19. Draft pole 21 of the drawn vehicle is pivotally connected by pin 22 to drawbar 23 of the tractor.

The drawbar is mounted for free lateral swinging movement in one relatively adjusted position with respect to the tractor when pulling the drawn vehicle, and upon reverse movement of the tractor, or when the tractor is pushed by the drawn vehicle, is moved relative to the tractor to a fixed position to facilitate maneuvering of the vehicle train in such operations. To accomplish this purpose, means are provided on the transmission case and entirely therebeneath engaging the drawbar and adapted to hold the drawbar against lateral swinging movement when compression is placed thereon, and to permit free lateral swinging movement when the drawbar is under tension.

Drawbar 23 (Figs. 2 and 3) is formed at its front end with slot 24 engaging pivot means comprising pin 26 secured in spaced walls 27, 28 of bracket 29, which is secured to pad 31 (Fig. 1) integrally formed with transmission case 10, by screws 32. Said bracket 29 (Figs. 2 and 3) guides the front end of drawbar 23, and provides mounting means for drawbar pivot pin 26, which transmits draft forces thereto when the drawbar is in free lateral swinging position.

The rear end of drawbar 23 (Figs. 2 and 3) is guided and braced by vertically spaced plates 36 having spacer plates 37 (Figs. 1 and 3) secured therebetween at each side. Plates 36, 37 (Figs. 2 and 3) are mounted as a unit on transmission case 10 by brackets 38 and screws 39.

Intermediate its ends drawbar 23 is apertured to provide opposite, rearwardly converging cam surfaces 41, 42 adapted for cooperation with pin 43 secured in boss 44 (Fig. 3) integral with transmission case 10. Cam surfaces 41, 42 converge to apex 45 (Fig. 2) providing a socket for pin 43. Said pin 43 provides draft transmitting means when the drawbar is moved relatively to the tractor when placed under compression, and also serves as means for limiting lateral swinging movement of the drawbar when said drawbar is under tension, i. e., in the position shown in Figs. 1-3. Said pin 43 also serves to prevent oscillation of drawbar 23 about pin 26 when the drawbar is under compression in a manner about to be described.

Figure 4:
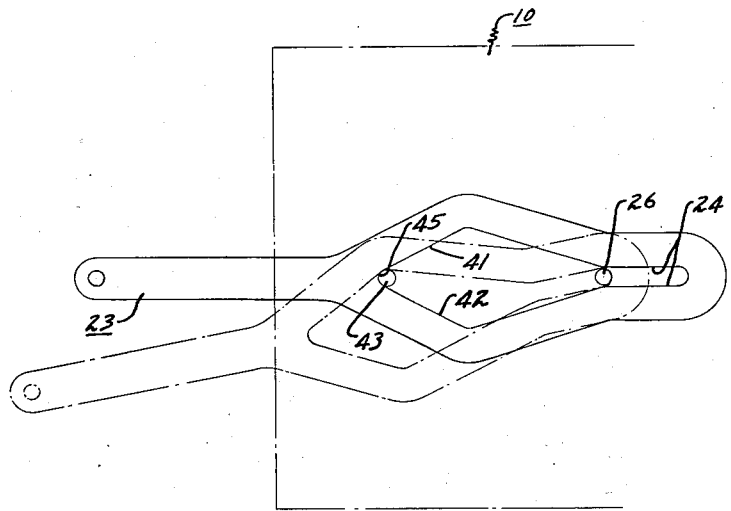

Fig. 4 illustrates various positions of drawbar 23 with respect to transmission case 10, said drawbar being shown in full lines in its fixed position with respect to the tractor. When the forces on the drawbar change from tension to compression, one of cam surfaces 41, 42 engages pin 43 if drawbar 23 is displaced laterally from its central position, serving as means for moving the drawbar relatively to the tractor from its free lateral swinging position to its fixed position, where pin 43 engages said drawbar at apex 45 of cam surfaces 41, 42, pin 26 remaining in slot 24. The fixed position of the drawbar is indicated in full lines in Fig. 4. The phantom line position indicates the extreme righthand position of the drawbar, pin 43 engaging said drawbar at the respective outer ends of cam surfaces 41, 42. It is believed obvious that, if the drawbar is in any laterally displaced position, and is placed under compression, it is moved to the fixed position thereof.

Thus it is seen that the drawbar is mounted for free lateral swinging movement under a load placing tension thereon, and is placed automatically in a fixed position under loads placing compression thereon. It is to be noted that the means for positioning and maintaining the drawbar in a fixed position when under compression are positioned entirely beneath the transmission case or frame of the tractor. This feature is very advantageous as it provides a simple and compact structure which is economical to manufacture and assemble, and which does not interfere with the mounting of auxiliary attachments on the tractor. The above advantages are also obtained in part by placing the drawbar engaging surfaces of the positioning and maintaining means in substantially the same horizontal plane as the drawbar.

Figure 5:
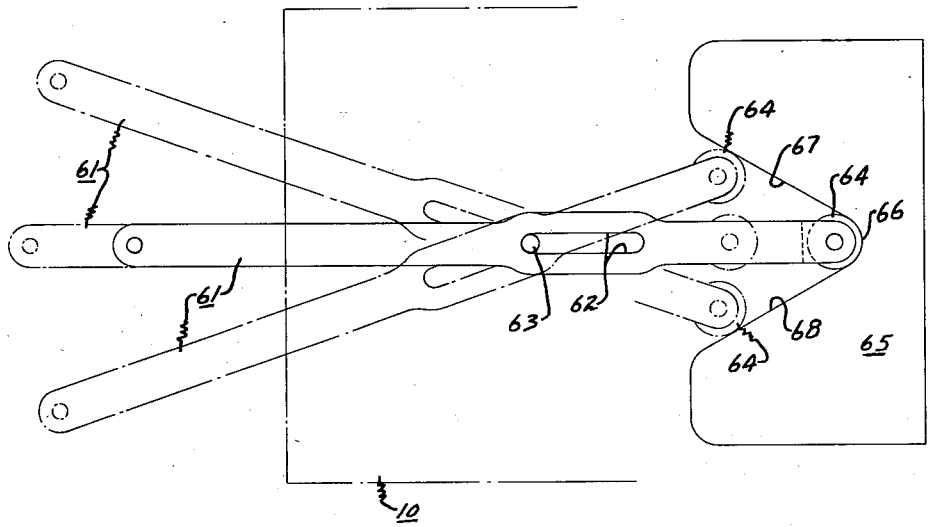
Fig. 5 is a diagrammatic plan view of the second form of the invention.

In the second form of the invention, drawbar 61 (Fig. 5), shown in full lines in its fixed position, is provided intermediate its ends with longitudinal slot 62, engaged by pin 63 providing pivot means for the drawbar. Pin 63 may be mounted on transmission case 10, similarly to pin 43 (Fig. 3). At its rear end, drawbar 61 may be supported on transmission case 10 similarly to drawbar 23. At its front end, drawbar 61 has roller 64 adapted to engage plate 65 at apex 66 of forwardly converging cam surfaces 67, 68, when said drawbar is under compression, preventing, with pin 63, any lateral swinging movement thereof.

When drawbar 61 is placed under tension, movement thereof relative to the tractor occurs from its fixed position to its free lateral swinging position, pin 63 engaging the front end of slot 62. This condition is illustrated by the phantom line positions, roller 64 engaging one of cam surfaces 67, 68, in the extreme lateral positions of the drawbar. It is believed obvious that, upon initial placing of compression on the drawbar, one of cam surfaces 67, 68 is engaged by roller 64, if the drawbar is displaced from its central position, and the drawbar is moved relatively to the tractor to its fixed position. It is to be noted that in this form of the invention the means for positioning and maintaining the drawbar in a fixed position when under compression is positioned entirely beneath transmission case 10, and that the drawbar engaging surfaces of the positioning and maintaining means lie substantially in the horizontal plane of the drawbar, one of said means engaging an end of the drawbar.

The above described forms of the invention are preferred due to the simplicity and compactness of their structure which lends itself to economy of manufacture and assembly. The following described forms of the invention, while more complicated in structure, retain certain of the advantages noted in describing the first and second forms of the invention.

In the third form of the invention (Fig. 6), pivot means are provided on the frame having sliding, pivotal engagement with the drawbar, and automatically operable lever means are provided on the frame movable to engage the drawbar at spaced points to prevent lateral swinging movement thereof under loads placing compression thereon. Drawbar 71 is provided at its front end with longitudinal slot 72 engaged by pivot means comprising pin 73, mounted on transmission case 10 similarly to pin 43 of the first described form of the invention. At its rear end, drawbar 71 may be supported on case 10 similarly to said described drawbar 23.

Intermediate its ends drawbar 71 is provided with integral vertical lug 74 having a flat front face adapted for contact by curved front ends 76, 77 of levers 78, 79. Said levers 78, 79 are pivoted on pins 81, 82 on crankcase 10, and have rollers 83 mounted in the rear ends thereof adapted to contact the sides of drawbar 71 in the fixed positions thereof.

Drawbar 71 is illustrated in full lines in its fixed position which it occupies when under compression. In this position, ends 76, 77 of levers 78, 79 are engaged by lug 74 on drawbar 71, urging rollers 83 against the respective sides of the drawbar to prevent lateral swinging movement thereof. In this position, pin 73 engages the rear end of slot 72. The various parts assume this position in response to movement of the drawbar relative to the tractor when the load on the drawbar changes from tension to compression. When the tractor is pulling the draft vehicle, and the drawbar is under tension, said drawbar is moving relatively to the tractor to its free lateral swinging position illustrated in phantom lines in Fig. 6. In the free lateral swinging position, pin 73 engages the front end of slot 72, and lug 74 is moved rearwardly to permit free oscillation of levers 78, 79, lever 78 being illustrated in its extreme outward position in phantom lines in the figure.

Thus it is seen that the drawbar is maintained in a fixed position under loads placing compression thereon, and is movable relative to the tractor from such fixed position to a free lateral swinging position under loads placing tension thereon. It is to be noted that the means for positioning and maintaining the drawbar in a fixed position are located entirely beneath the frame of the tractor.

The fourth form of the invention is illustrated in Fig. 7 and is generally similar to the form of the invention illustrated in Fig. 6, the operation of the drawbar and the mounting means therefor being substantially the same. Drawbar 91 has slot 92 adjacent its front end engaged by pin 93 on transmission case 10. At its rear end said drawbar is provided with integral vertical extension 94 engaging by levers 95, 96 pivoted at 97, 98 on transmission case 10. It is not believed necessary to describe the operation of the form of the invention illustrated in Fig. 7 as it is identical with that described in connection with Fig. 6. It is to be noted that in this form of the invention, also, the means for positioning and maintaining the drawbar in a fixed position is located entirely beneath the transmission case or frame of the tractor, the means engaging an end of the drawbar.

Figs. 8–10 illustrate a fifth form of the invention. In this form of the invention, the drawbar is mounted for movement relative to the tractor from a fixed position to a free lateral swinging position, the mounting means including cam means movably mounted on the transmission case and responsive to movement of the drawbar under loads placing compression thereon to move said drawbar to its fixed position.

Drawbar 101 (Figs. 8 and 9) is provided at its front end with longitudinal slot 102 engaged by pin 103 mounted in bracket 104 (Fig. 9) which is secured to pad 106 integral with transmission case 10. Said pin 103 provides the pivot point of the drawbar and serves as draft transmitting means from the tractor to the drawbar. Bracket 104 is similar to bracket 31 of the first form of the invention. Adjacent its rear end, drawbar 101 is supported and guided by vertically spaced plates 107, 108 secured to transmission case 10. Forwardly of plates 107, 108, drawbar 101 is provided with integral lateral extensions 111 which are engaged by forked front end 112 of cam lever 113, pivoted on shaft 114 on transmission case 10. The rear arm of lever 113 (Figs. 8 and 10) extends laterally with respect to transmission case 10 and is provided with opposite similar cam surfaces 116, 117 converging upwardly to socket 118. Cam surfaces 116, 117 and socket 118 are adapted for engagement with roller 119 rotatably mounted on drawbar 101 adjacent the rear end thereof.

Drawbar 101 is illustrated in full lines in Figs. 8 and 9 in its fixed position, i. e., in its most forward position with respect to the tractor where it is held against lateral movement by the engagement of roller 119 in socket 118. The phantom line position of drawbar 101 in Fig. 9 illustrates its free lateral swinging position where lugs 111 no longer maintain cam lever 113 in the full line position illustrated in Fig. 9 but permit oscillation of said lever in a clockwise direction in response to lateral movement of drawbar 101, roller 119 engaging either of cam surfaces 116, 117. It is believed obvious that upon movement of drawbar 101 from its free lateral swinging position to its fixed position, lever 113 is effective irrespective of the laterally displaced position of the drawbar to move said drawbar to its central fixed position, where it is maintained so long as compression is placed thereon.

I, therefore, claim as my invention:

1. In a tractor, a frame, a drawbar, pivot means on said frame having a relative sliding, pivotal engagement with said drawbar, and lever means movably mounted on said frame engageable with said drawbar at spaced points, said pivot means and said lever means being responsive to relative movement of said drawbar and said frame to provide a free lateral swinging position for said drawbar and a fixed position therefor on said tractor.

2. In a tractor, a frame, a drawbar relatively movable longitudinally of said frame when the load thereon changes from tension to compression, and vice versa, pivot means on said frame having a relative sliding, pivotal engagement with said drawbar, and lever means on said frame and engageable with said drawbar, said lever means and said pivot means being responsive to relative longitudinal movement of said drawbar on said frame to provide free lateral swinging movement of said drawbar under loads placing tension thereon, and to prevent lateral swinging movement of said drawbar under loads placing compression thereon.

3. In a tractor, a frame, a drawbar, pivot means on said frame having a relative sliding, pivotal engagement with said drawbar, and lever means movably mounted on said frame engageable with said drawbar at spaced points, said pivot means and said lever means being positioned entirely beneath said frame and being responsive to relative movement of said drawbar and said frame to provide a free lateral swinging position for said drawbar and a fixed position therefor on said tractor.

4. In a draft vehicle, a drawbar mounted to shift longitudinally with respect to said vehicle when the forces imposed upon said drawbar change from tension to compression, and means for locking the drawbar against lateral movement, comprising cam members movable by said drawbar upon shifting movement thereof, a cam engaging surface on said drawbar, and portions on said cam members automatically engaged by said drawbar surface upon shifting of said drawbar.

5. In a tractor, a frame, a drawbar, pivot means on said frame having relative sliding, pivotal engagement with said drawbar at an end thereof, and a pair of opposite members movably mounted on said frame, each of said members being engageable with said drawbar at spaced points intermediate the length thereof in response to relative movement of said drawbar on said frame under loads placing compression thereon to prevent lateral swinging movement thereof.

6. In a tractor, a frame, a drawbar, pivot means on said frame having relative sliding, pivotal engagement with said drawbar adjacent an end thereof, and a pair of opposite members movably mounted on said frame and engageable with said drawbar at said end and at a point intermediate the length thereof in response to relative movement of said drawbar on said frame under loads placing compression thereon to prevent lateral swinging movement thereof.

7. In a tractor, a frame, a drawbar mounted for relative movement on said frame, pivot means on said frame having a sliding, pivotal engagement with said drawbar, and cam means movably mounted on said frame, said cam means being movable to engage said drawbar to prevent lateral swinging movement thereof in response to relative movement of said drawbar on said frame under loads placing compression on said drawbar.

8. In a draft vehicle, a drawbar, means mounting said drawbar for swinging and endwise movement, and movable means on said vehicle including a pivotally mounted member engaging said drawbar for holding said drawbar against swinging movement when said drawbar is subjected to compression forces, said movable means being operable by said endwise movement of said drawbar.

9. In a draft vehicle, a drawbar, means mounting said drawbar for swinging and endwise movement on said vehicle, and cam means movably mounted on said vehicle and engaging said drawbar, said cam means being movable to prevent said swinging movement thereof in response to said endwise movement of said drawbar.

10. In a draft vehicle, a drawbar, means mounting said drawbar for swinging and endwise movement on said vehicle, a pair of levers on opposite sides of said drawbar, means pivotally mounting said levers on said vehicle, and means on said drawbar adapted for simultaneous engagement with one pair of adjacent ends of said levers upon endwise movement of said drawbar, the other pair of adjacent ends of said levers being engageable with said drawbar to prevent swinging movement thereof in response to actuation of said levers upon said endwise movement of said drawbar.

11. In a draft vehicle, a drawbar, means mounting said drawbar for swinging and endwise movement on said vehicle, and lever means movably mounted on said frame and engaging with said drawbar, said lever means being operable by endwise movement of said drawbar to prevent swinging movement thereof.

12. In a draft vehicle, a drawbar, means mounting said drawbar for swinging and endwise movement on said vehicle, and lever means movably mounted on said frame and engaging with said drawbar, said lever means being responsive to relative movement of said drawbar with respect to said vehicle to provide a swinging position for said drawbar and a fixed position therefor.

GEORGE W. HOPKINS, Jr.